(12) United States Patent
Maille

(10) Patent No.: US 10,385,183 B2
(45) Date of Patent: *Aug. 20, 2019

(54) PROCESS OF RECYCLING MIXED PET PLASTIC ARTICLES

(71) Applicant: CARBIOS, Saint-Beauzire (FR)

(72) Inventor: Emmanuel Maille, Ennezat (FR)

(73) Assignee: CARBIOS, Saint-Beauzire (FR)

( * ) Notice: Subject to any disclaimer, the term of this patent is extended or adjusted under 35 U.S.C. 154(b) by 84 days.

This patent is subject to a terminal disclaimer.

(21) Appl. No.: 15/310,458

(22) PCT Filed: May 12, 2015

(86) PCT No.: PCT/EP2015/060521
§ 371 (c)(1),
(2) Date: Nov. 11, 2016

(87) PCT Pub. No.: WO2015/173265
PCT Pub. Date: Nov. 19, 2015

(65) Prior Publication Data
US 2017/0114205 A1    Apr. 27, 2017

(30) Foreign Application Priority Data

May 16, 2014  (EP) .................................... 14305722

(51) Int. Cl.
*C08J 11/10*   (2006.01)
*B29B 17/02*   (2006.01)

(52) U.S. Cl.
CPC ............. *C08J 11/105* (2013.01); *B29B 17/02* (2013.01); *B29B 2017/0203* (2013.01); *B29B 2017/0213* (2013.01); *C08J 2367/02* (2013.01); *Y02W 30/702* (2015.05)

(58) Field of Classification Search
None
See application file for complete search history.

(56) References Cited

U.S. PATENT DOCUMENTS

| | | | |
|---|---|---|---|
| 4,013,987 A * | 3/1977 | Foster | H01B 3/04 174/120 SR |
| 5,032,512 A | 7/1991 | Witholt et al. | |
| 5,145,779 A | 9/1992 | Pometto et al. | |
| 5,212,219 A | 5/1993 | Griffin | |
| 5,316,847 A | 5/1994 | Suominen | |
| 5,378,738 A | 1/1995 | Deguchi et al. | |
| 5,426,047 A | 6/1995 | Ito et al. | |
| 6,312,578 B1 | 11/2001 | Canivenc et al. | |
| 6,429,006 B1 | 8/2002 | Porro et al. | |
| 7,465,575 B2 | 12/2008 | Nilsson | |
| 7,534,597 B2 | 5/2009 | Hause et al. | |
| 7,960,154 B1 | 6/2011 | Nakajima et al. | |
| 8,137,953 B2 | 3/2012 | Miller et al. | |
| 8,476,056 B2 | 7/2013 | Hoang et al. | |
| 8,614,076 B2 | 12/2013 | Wada et al. | |
| 8,859,260 B2 | 10/2014 | Sawai et al. | |
| 9,476,073 B2 | 10/2016 | Boisart | |
| 9,528,132 B2 | 12/2016 | Mazzoli et al. | |
| 10,124,512 B2 * | 11/2018 | Boisart | C08J 11/105 |
| 2005/0261465 A1 | 11/2005 | Nagarajan | |
| 2006/0106120 A1 | 5/2006 | Abe et al. | |
| 2011/0008855 A1 | 1/2011 | Park et al. | |
| 2011/0200771 A1 | 8/2011 | Barclay | |
| 2011/0245057 A1 | 10/2011 | Scoledes et al. | |
| 2011/0319588 A1 | 12/2011 | Coupin et al. | |
| 2012/0184005 A1 | 7/2012 | Ferreira et al. | |
| 2013/0274373 A1 | 10/2013 | Yoshikawa et al. | |
| 2014/0303278 A1 | 10/2014 | Ferreira et al. | |
| 2015/0056673 A1 | 2/2015 | Boisart | |
| 2015/0290840 A1 | 10/2015 | Boisart et al. | |
| 2016/0280881 A1 | 9/2016 | Boisart et al. | |
| 2017/0313998 A1 | 11/2017 | Alvarez et al. | |
| 2017/0349723 A1 | 12/2017 | Ferreira et al. | |
| 2018/0051264 A1 | 2/2018 | Li et al. | |
| 2018/0142097 A1 | 5/2018 | Guemard et al. | |
| 2018/0186943 A1 | 7/2018 | Chateau et al. | |

FOREIGN PATENT DOCUMENTS

| | | |
|---|---|---|
| CN | 101 457 218 | 6/2009 |
| CN | 102250379 | 11/2011 |
| CN | 102675712 | 9/2012 |
| CN | 103980535 | 8/2014 |
| EP | 0 421 413 | 4/1991 |
| EP | 0 738 752 | 10/1996 |
| EP | 1 548 053 | 6/2005 |

(Continued)

OTHER PUBLICATIONS

Chen et al., J. Biol. Chem. 283(38): 25854-25862 (2008).*
Herrero Acero et al., Biotechnol. Bioeng. 110: 2581-2590 (2013; published online Apr. 29, 2013).*
Wikipedia, https://web.archive.org/web/20130424032652/https://en.wikipedia.org/wiki/Polyethylene_terephthalate, archived Apr. 24, 2013, accessed Aug. 13, 2018.*
Kim et al., J. Appl. Polymer Sci. 81: 793-799 (2001).*
Wikipedia, https://web.archive.org/web/20110129133758/https://en.wikipedia.org/wiki/Metallised_film, archived Jan. 29, 2011, accessed Feb. 1, 2019.*
Herrero Acero, E. et al. "Enzymatic Surface Hydrolysis of PET: Effect of Structural Diversity on Kinetic Properties of Cutinases from *Thermobifida*" Macromolecules, 2011, pp. 4632-4640, vol. 44, No. 12.

(Continued)

*Primary Examiner* — Erin M. Bowers
(74) *Attorney, Agent, or Firm* — Saliwanchik, Lloyd & Eisenschenk

(57) ABSTRACT

The invention relates to a method for recycling at least one mixed PET plastic article, the method comprising degrading at least PET of the mixed PET plastic article to monomers and/or oligomers using an enzyme and recovering the resulting monomers and/or oligomers. The method of the invention may be used for depolymerizing, simultaneously or sequentially at least two different polymers of the mixed PET plastic article, and/or for recycling at least two mixed PET plastic articles.

22 Claims, No Drawings
Specification includes a Sequence Listing.

(56) References Cited

FOREIGN PATENT DOCUMENTS

| | | | |
|---|---|---|---|
| EP | 2 013 280 | | 1/2009 |
| EP | 2 348 122 | | 7/2011 |
| EP | 2348122 | * | 7/2011 |
| EP | 2 377 945 | | 10/2011 |
| EP | 2 471 910 | | 7/2012 |
| EP | 2 626 386 | | 8/2013 |
| JP | 2000-506442 | | 5/2000 |
| JP | 2002-293982 | | 10/2002 |
| JP | 2002-320499 | | 11/2002 |
| JP | 2002 362578 | | 12/2002 |
| JP | 2003-079388 | | 3/2003 |
| JP | 2003-128835 | | 5/2003 |
| JP | 2004 058010 | | 2/2004 |
| JP | 2004-290130 | | 10/2004 |
| JP | 2004 292705 | | 10/2004 |
| JP | 2007 319092 | | 12/2007 |
| JP | 2012 149273 | | 8/2012 |
| JP | 2012-152171 | | 8/2012 |
| JP | 2013 000099 | | 1/2013 |
| JP | 5 630597 | | 11/2014 |
| KR | 20110045975 | | 5/2011 |
| WO | WO 89/10381 | | 11/1989 |
| WO | WO 2005/026245 | | 3/2005 |
| WO | WO 2010/012805 | | 2/2010 |
| WO | WO 2010/081887 | | 7/2010 |
| WO | WO 2011/039489 | | 4/2011 |
| WO | WO 2013/144239 | | 10/2013 |
| WO | WO 2014/079844 | | 5/2014 |
| WO | WO 2014/122698 | | 8/2014 |
| WO | WO 2014/167518 | | 10/2014 |
| WO | WO 2014/167562 | | 10/2014 |
| WO | WO 2015/067619 | | 5/2015 |
| WO | WO 2015/097104 | | 7/2015 |
| WO | WO 2015/173265 | | 11/2015 |
| WO | WO 2016/198650 | | 12/2016 |
| WO | WO 2016/198652 | | 12/2016 |
| WO | WO 2017/108577 | | 6/2017 |
| WO | WO2017/198786 | | 11/2017 |

OTHER PUBLICATIONS

Herrero Acero, E. et al. "Surface Engineering of a Cutinase From *Thermobifida cellulosilytica* for Improved Polyester Hydrolysis" *Biotechnology & Bioengineering*, Oct. 2013, pp. 2581-2590, vol. 110, No. 10.
Shah, A. A. et al. "Degradation of aliphatic and aliphatic—aromatic co-polyesters by depolymerases from *Roseateles depolymerans* strain TB-87 and analysis of degradation products by LC-MS" *Polymer Degradation and Stability*, Oct. 16, 2013, pp. 2722-2729, vol. 98, No. 12.
Written Opinion in International Application No. PCT/EP2015/060521, dated Jul. 20, 2015, pp. 1-6.
Matsuda, E. et al. "Gene Cloning and Molecular Characterization of an Extracellular Poly($_L$-Lactic Acid) Depolymerase from *Amycolatopsis* sp. Strain K104-1" *Journal of Bacteriology*, Nov. 2005, pp. 7333-7340, vol. 187, No. 21.
Database WPI, Accession No. 2009-K99963, Jun. 17, 2009, pp. 1-2, XP-002690934.
Database WPI, Accession No. 2008-F66138, Dec. 13, 2007, pp. 1-2, XP-002690935.
Wang, Z.-Y. et al. "Gene Cloning and Characterization of a Poly($_L$L-Lactic Acid) Depolymerase from *Pseudomonas* sp. Strain DS04-T" *J Polym Environ*, Aug. 28, 2011, pp. 827-833, vol. 19, No. 4.
Akutsu-Shigeno, Y. et al. "Cloning and Sequencing of a Poly($_{DL}$-Lactic Acid) Depolymerase Gene from *Paenibacillus amylolyticus* Strain TB-13 and Its Functional Expression in *Escherichia coli*" *Applied and Environmental Microbiology*, May 2003, pp. 2498-2504, vol. 69, No. 5.
Petrov, K. et al. "L(+)-Lactic acid production from starch by a novel amylolytic *Lactococcus lactis* subsp. lactis 884" *Food Microbiology*, Jun. 2008, pp. 550-557, vol. 25.
Currently pending claims of U.S. Appl. No. 14/443,524, 2016, pp. 1-4.
Bernard, N. et al. "Cloning of the D-lactate dehydrogenase gene from *Lactobacillus delbrueckii* subsp. bulgaricus by complementation in *Escherichia coli*" *FEBS*, Sep. 1991, pp. 61-64, No. 1.
Wieczorek, A. et al. "Engineering the cell surface display of cohesins for assembly of cellulosome-inspired enzyme complexes on *Lactococcus lactis*" *Microbial Cell Factories*, Sep. 2010, pp. 1-13, Vo. 9, No. 69.
Wieczorek, A. et al. "Effects of synthetic cohesin-containing scaffold protein architecture on binding dockerin-enzyme fusions on the surface of *Lactococcus lactis*" *Microbial Cell Factories*, 2012, pp. 1-13, vol. 160, No. 11.
Koukiekolo, R. et al. "Degradation of Corn Fiber by *Clostridium cellulovorans* Cellulases and Hemicellulases and Contribution of Scaffolding Protein CbpA" *Applied and Environmental Microbiology*, Jul. 1, 2005, pp. 3504-3511, vol. 71, No. 7.
Cha, J. et al. "Effect of Multiple Copies of Cohesins on Cellulase and Hemicellulase Activities of *Clostridium cellulovorans* Minicellulosomes" *Journal of Microbiology and Biotechnology*, 2007, pp. 1782-1788, vol. 17, No. 11.
Kataeva, I. et al. "Interaction between *Clostridium thermocellum* endoglucanase CelD and polypeptides derived from the cellulosome-integrating protein CipA: stoichiometry and cellulolytic activity of the complexes" *Biochemical Journal*, 1997, pp. 617-624, vol. 326, No. 2.
Wen, F. et al. "Yeast Surface Display of Trifunctional Minicellulosomes for Simultaneous Saccharification and Fermentation of Cellulose to Ethanol" *Applied and Environmental Microbiology*, Feb. 1, 2010, pp. 1251-1260, vol. 76, No. 4.
Hyeon, J. E. et al. "Production of minicellulosomes for the enhanced hydrolysis of cellulosic substrates by recombinant *Corynebacterium glutamicum*" *Enzyme and Microbial Technology*, 2011, pp. 371-377, vol. 48.
Sun, J. et al. "Direct Conversion of Xylan to Ethanol by Recombinant *Saccharomyces cerevisiae* Strains Displaying an Engineered Minihemicellulosome" *Applied and Environmental Microbiology*, Jun. 2012, pp. 3837-3845, vol. 78, No. 11.
Database EMBL [Online] Accession No. HC441374, "Sequence 9 from Patent WO2010012805" Feb. 20, 2010, pp. 1-3, XP-002697306.
Database Geneseq [Online] Accession No. AZM34659, "*Clostridium* sp. Cellulose-binding protein-A (CbpA) DNA SEQ: 6" Oct. 13, 2011, p. 1, XP-002697307.
Written Opinion in International Application No. PCT/EP2013/061413, dated Aug. 5, 2013, pp. 1-7.
Devos, D. et al. "Practical Limits of Function Prediction" *Proteins: Structure, Function and Genetics*, 2000, pp. 98-107, vol. 41.
Whisstock, J. C. et al. "Prediction of protein function from protein sequence and structure" *Quarterly Reviews of Biophysics*, 2003, pp. 307-340, vol. 36, No. 3.
Witkowski, A. et al. "Conversion of a β-Ketoacyl Synthase to a Malonyl Decarboxylase by Replacement of the Active-Site Cysteine with Glutamine" *Biochemistry*, 1999, pp. 11643-11650, vol. 38.
Kisselev, L. "Polypeptide Release Factors in Prokaryotes and Eukaryotes: Same Function, Different Structure" *Structure*, Jan. 2002, pp. 8-9, vol. 10.
Database WPI, Accession No. 2005-262580, Mar. 24, 2005, pp. 1-3, XP-002690554.
Database WPI, Accession No. 2004-751104, Oct. 21, 2004, pp. 1-2, XP-002690555.
Currently pending claims of U.S. Appl. No. 14/387,285, 2014, pp. 1-3.
Yoshida, S. et al. "A bacterium that degrades and assimilates poly(ethylene terephthalate)" *Science*, Mar. 11, 2016, pp. 1196-1199, vol. 351.
Demirel, B. et al. "Crystallization Behavior of PET Materials" *BAU Fen Bil. Enst. Dergisi Cilt*, 2011, pp. 26-35, vol. 13, No. 1.
Kyrikou, I. et al. "Biodegradation of Agricultural Plastic Films: A Critical review" *J Polym Environ*, 2007, pp. 125-150, vol. 15.
Chen, S. et al. "Identification and Characterization of Bacterial Cutinase" *The Journal of Biological Chemistry*, Sep. 19, 2008, pp. 25854-25862, vol. 238, No. 38.

(56) References Cited

OTHER PUBLICATIONS

Ronkvist, A. M. et al. "Cutinase-Catalyzed Hydrolysis of Poly(ethylene terephthalate)" *Macromolecules*, 2009, pp. 5128-5138, vol. 42.
Nabil, H. et al. "Recycled Polyethylene Terephthalate Filled Natural Rubber Compounds: Effects of Filler Loading and Types of Matrix" *Journal of Elastomers and Plastics*, 2011, pp. 1-21, vol. 00-2011.
Bartolome, L. et al. "Recent Developments in the Chemical Recycling of PET" Material Recycling—Trends and Perspectives, Mar. 16, 2012, pp. 1-21.
Arutchelvi, J. et al. "Biodegradation of polyethylene and polypropylene" *Indian Journal of Biotechnology*, Jan. 2008, pp. 9-22, vol. 7.
Iwamoto, A. et al. "Enzymatic degradation of plastics containing polycaprolactone" *Polymer Degradation and Stability*, Jan. 1, 1994, pp. 205-213, vol. 45.
Mueller, R.-J. "Biological degradation of synthetic polyesters—Enzymes as potential catalysts for polyester recycling" *Process Biochemistry*, 2006, pp. 2124-2128, vol. 41, No. 10.
Written Opinion in International Application No. PCT/EP2014/073742, dated Aug. 8, 2015, pp. 1-5.
Sukkhum, S. et al. "A novel poly($_L$-lactide) degrading actinomycetes isolated from Thai forest soil, phylogenic relationship and the enzyme characterization" *The Journal of General and Applied Microbiology*, 2009, pp. 459-467, vol. 55, No. 6.
Sukkhum, S. et al. "Poly($_L$-Lactide)-Degrading Enzyme Production by *Actinomadura keratinilytica* T16-1 in 3 L Airlift Bioreactor and Its Degradation Ability for Biological Recycle" *Journal of Microbiology and Biotechnology*, Jan. 28, 2012, pp. 92-99, vol. 22, No. 1.
Written Opinion in International Application No. PCT/EP2015/074222, dated Feb. 1, 2016, pp. 1-5.
Gouda, M. K. et al. "Production of a Polyester Degrading Extracellular Hydrolase from *Thermomonospora fusca*" *Biotechnology Progress*, Sep. 2002, pp. 927-934, vol. 18, No. 5.
Oda, Y. et al. "Degradation of Polylactide by Commercial Proteases" *Journal of Polymers and the Environment*, Jan. 2000, pp. 29-32, vol. 8, No. 1.
Written Opinion in International Application No. PCT/EP2016/055348, dated Jun. 2, 2016, pp. 1-6.
Database UniProt [Online] Accession No. I0LED3, Jun. 13, 2012, pp. 1-2, XP-002743807.
Database Geneseq [Online] Accession No. BAJ28992, Jan. 31, 2013, pp. 1-10, XP-002743803.
Database Geneseq [Online] Accession No. BAJ28991, Jan. 31, 2013, pp. 1-2, XP-002743804.
Database UniProt [Online] Accession No. F4F956, Jun. 28, 2011, pp. 1-2, XP-002743805.
Database UniProt [Online] Accession No. A8LWF7, Dec. 4, 2007, p. 1-2, XP-002743806.
Niaounakis, 2013. Chapter 4: Disposal. Biopolymers Reuse, Recycling, and Disposal. A Volume in Plastics Design Library, a PDL Handbook Series. ISBN 978-1-4557-3145-9, published by Elsevier Inc, pp. 107-150.
Sugimori, Mar. 2013. Protease, washing agent containing the protease, and method of manufacturing the washing agent. EMBL AB809463, pp. 1-2.
Albertsson, A- C. et al. "Chemistry and biochemistry of polymer biodegradation" *Chemistry and Technology of Biodegradable Polymers*, Jan. 1, 1994, pp. 7-17, Section 2.
Database WPI [Online] Accession No. 2012-Q50933, Sep. 9, 2012, p. 1, XP-002740253.
Database WPI [Online] Accession No. 2004-046313, May 8, 2003, pp. 1-2, XP-002740254.
Written Opinion in International Application No. PCT/EP2015/080557, dated Feb. 3, 2016, pp. 1-6.
Written Opinion in International Application No. PCT/EP2016/063369, dated Aug. 1, 2016, pp. 1-6.
Written Opinion in International Application No. PCT/EP2016/063373, dated Aug. 8, 2017, pp. 1-7.
Okino, S. et al. "Production of D-lactic acid by *Corynebacterium glutamicum* under oxygen deprivation" *Applied Microbiology and Biotechnology*, Jan. 10, 2008, pp. 449-454, vol. 78, No. 3.
Database WPI [Online] Accession No. 2012-K88398, Jan. 27, 2011, pp. 1-2, XP-002759107.
Written Opinion in International Application No. PCT/EP2016/081205, dated Jun. 1, 2017, pp. 1-19.
Written Opinion in International Application No. PCT/EP2017/062028, dated Jun. 30, 2017, pp. 1-5.

\* cited by examiner

SEQUENCE LISTING

```
<160> NUMBER OF SEQ ID NOS: 8

<210> SEQ ID NO 1
<211> LENGTH: 31
<212> TYPE: DNA
<213> ORGANISM: artificial sequence
<220> FEATURE:
<223> OTHER INFORMATION: primer

<400> SEQUENCE: 1
cccccgctca tatggccaac ccctacgagc g                               31

<210> SEQ ID NO 2
<211> LENGTH: 59
<212> TYPE: DNA
<213> ORGANISM: artificial sequence
<220> FEATURE:
<223> OTHER INFORMATION: primer

<400> SEQUENCE: 2
```
gtgttctaag cttcagtggt ggtggtggtg gtgctcgagt gccaggcact gagagtagt    59

<210> SEQ ID NO 3
<211> LENGTH: 26
<212> TYPE: DNA
<213> ORGANISM: artificial sequence
<220> FEATURE:
<223> OTHER INFORMATION: primer

<400> SEQUENCE: 3
gagcggataa caattcccct ctagaa    26

<210> SEQ ID NO 4
<211> LENGTH: 21
<212> TYPE: DNA
<213> ORGANISM: artificial sequence
<220> FEATURE:
<223> OTHER INFORMATION: primer

<400> SEQUENCE: 4
cagcttcctt tcgggctttg t    21

<210> SEQ ID NO 5
<211> LENGTH: 63
<212> TYPE: DNA
<213> ORGANISM: artificial sequence
<220> FEATURE:
<223> OTHER INFORMATION: megaprimer

<400> SEQUENCE: 5
cccttctccg tgagtgaaga aaacgtctcc cgcttcggtg ctgacggttt cggcggcggc    60
acc    63

<210> SEQ ID NO 6
<211> LENGTH: 63
<212> TYPE: DNA
<213> ORGANISM: artificial sequence
<220> FEATURE:
<223> OTHER INFORMATION: megaprimer

<400> SEQUENCE: 6
ggtgccgccg ccgaaaccgt cagcaccgaa gcgggagacg ttttcttcac tcacggagaa    60
ggg    63

<210> SEQ ID NO 7
<211> LENGTH: 63
<212> TYPE: DNA
<213> ORGANISM: artificial sequence
<220> FEATURE:
<223> OTHER INFORMATION: megaprimer

<400> SEQUENCE: 7
acccgaccga cgccctgctc gaagccagca gcggcccctt ctccgtgagt gaagaaaacg    60
tct    63

<210> SEQ ID NO 8
<211> LENGTH: 63
<212> TYPE: DNA
<213> ORGANISM: artificial sequence
<220> FEATURE:

```
<223> OTHER INFORMATION: megaprimer

<400> SEQUENCE: 8
agacgttttc ttcactcacg gagaaggggc cgctgctggc ttcgagcagg gcgtcggtcg    60
ggt                                                                 63
```

PROCESS OF RECYCLING MIXED PET PLASTIC ARTICLES

CROSS-REFERENCE TO RELATED APPLICATION

This application is the U.S. national stage application of International Patent Application No. PCT/EP2015/060521, filed May 12, 2015.

The Sequence Listing for this application is labeled "Seq-List.txt" which was created on Oct. 24, 2016 and is 2 KB. The entire content of the sequence listing is incorporated herein by reference in its entirety.

The present invention relates to a process for recycling mixed PET plastic articles, such as waste plastics, containing polyethylene terephthalate polymers and at least one additional constituent. More particularly, the invention relates to a biological process for depolymerizing at least polyethylene terephthalate polymers of such mixed PET plastic articles and recovering resulting monomers and/or oligomers, which may be further reprocessed for synthesizing new polymers and manufacturing new plastic articles.

CONTEXT OF THE INVENTION

Plastics are inexpensive and durable materials, which can be used to manufacture a variety of products that find use in a wide range of applications, so that the production of plastics has increased dramatically over the last decades. More than 50% of these plastics are used for single-use disposable applications, such as packaging, agricultural films, disposable consumer items or for short-lived products that are discarded within a year of manufacture. Because of the durability of the polymers involved, substantial quantities of plastics are piling up in landfill sites and in natural habitats worldwide, generating increasing environmental problems. Even degradable and biodegradable plastics may persist for decades depending on local environmental factors, like levels of ultraviolet light exposure, temperature, presence of suitable microorganisms, etc.

In recent years, polyethylene terephthalate, an aromatic polyester produced from terephthalic acid and ethylene glycol, and better known as PET, has been widely employed in the manufacturing of several products for human consumption, including the manufacturing of packaging foods and beverages, especially convenience-sized soft drinks, juices and water, trays or stand up pouches, and the manufacturing of fibers used in textiles, fabrics, rugs or carpets, etc.

PET is the most closed-loop recycled plastic worldwide. Generally speaking, PET wastes are subjected to successive treatments leading to recycled PET (rPET). PET wastes (mainly bottles) are collected, sorted, pressed into bales, crushed, washed, chopped into flakes, melted and extruded in pellets and offered for sale. Then, recycled PET may be used to create fabrics for the clothing industry or new packaging such as bottles or blister packs, etc. This process is adapted to a pure plastic stream containing only PET. However, this process is not applicable on plastic products containing an additional component different from PET.

Additional process for recycling PET plastic wastes exist, known as "chemical recycling" allowing recovering the constituents of the polymer using a chemical catalyst. The resulting monomers and/or oligomers may then be used to re-manufacture plastic or to make other synthetic chemicals. However, up to now, such chemical recycling has only been performed on purified polymers and is not efficient on complex plastic articles constituted of a mix of polymers and other compounds and additives.

Due to its low weight, high strength, low permeability to gases and to the fact that PET has no deleterious effects on human health, PET is extensively employed in the manufacturing of mixed plastic articles constituted of PET and additional component(s), including without limitation other polymers, metal particles, glass particles or fibers, wood components, carbon fibers, etc.

For instance, for certain beverage packaging, such as beer bottles or sparkling water, PET sandwiches a polyvinyl alcohol (PVOH) layer or a polyamide layer to reduce the oxygen permeability of the packaging. Similarly, some rigid food packaging, such as food trays contain a layer of polyethylene (PE) as a welding agent between the tray and the lid both constituted of PET. Some flexible food packagings also contain a polyester film made from stretched PET metalized by a thin film of metal to reduce the permeability and to make it reflective and opaque. Insulating blankets made with metalized PET are also used, for instance in emergency cases for keeping a body warm. In a different manner, PET is also melted or filled with glass particles or fibers, to become stiffer and more durable and thus may be used in further industries. Similarly, wood plastic composites have been recently developed, wherein lumber and PET are melted and molded into lumber forms. These lumber forms are more rigid since the wood fibers act as reinforcement. These lumbers forms are also more resistant to moisture penetration and fungal rot degradation since the plastic encapsulates and binds the wood, so that this new mixed plastic exhibits some of the best properties of both wood and plastic.

However, the current mechanical or chemical recycling processes that have been developed are not adapted to these kinds of complex plastic articles that contain a mix of PET and other constituent(s), which cannot be easily separated from each other before recycling.

Thus, a need exists for a process for recycling mixed plastic articles that does not require preliminary sorting and expensive pretreatments and that may be used for recycling PET contained in different mixed plastic articles.

SUMMARY OF THE INVENTION

The invention proposes a biological process for recycling mixed PET plastics. More particularly, the invention shows that particular depolymerases may be used to efficiently depolymerize mixed PET plastic articles to generate monomers of ethylene glycol and/or terephthalic acid and/or oligomers and/or derivatives thereof including methyl-2-hydroxyethyl terephthalate (MHET) and/or bis(2-hydroxyethyl) terephthalate (BHET) and/or 2-hydroxyethyl benzoate (HEB) and/or dimethyl terephthalate (DMT) and/or benzoic acid (BA). The process of the invention allows recovering monomers and/or oligomers forming polymers of a mixed PET plastic article, and reprocessing them to synthesize new polymers and articles.

In this regard, it is an object of the invention to provide a process of recycling at least one mixed plastic article containing polyethylene terephthalate (PET) and at least one additional component (herein after "mixed PET plastic article"), comprising exposing the mixed PET plastic article to a depolymerase and recovering monomers and/or oligomers. Advantageously, the recovered monomers and/or oligomers result at least partially from the PET polymer depolymerization.

In a particular embodiment, the process comprises the following steps:
  Contacting the mixed PET plastic article(s) with the depolymerase under conditions and for a time suitable for the depolymerase to depolymerize at least PET polymers of the mixed PET plastic article(s);
  Recovering resulting monomers and/or oligomers; and optionally
  Reprocessing the recovered monomers and/or oligomers into one or several polymers.

The depolymerase may be any polymerase that depolymerizes PET such as a cutinase, a lipase or an esterase, preferably a cutinase. Furthermore, according to particular embodiments, several depolymerases may be used in combination, together or sequentially.

In a particular embodiment, the process of the invention is implemented by contacting the mixed PET plastic article(s) with a microorganism expressing and excreting the depolymerase. According to the invention, the microorganism may be a recombinant microorganism expressing and excreting a recombinant depolymerase and/or a recombinant microorganism with a modified metabolism preventing the consumption of the resulting monomers/oligomers.

Advantageously, the additional component constituting the mixed PET plastic article(s) is selected from polymers, as polyesters, polyamides, polyolefins and vinyl polymers, metal compounds, mineral compounds, fibers, paper, glass compounds, wood, wood compounds as lignin, cellulose or hemi-cellulose, starch, and derivatives thereof.

It is a further object of the invention to allow recycling of at least two different polymers of the mixed PET plastic article(s), wherein said at least two different polymers are degraded, simultaneously or sequentially.

It is another object of the process of the invention to allow recycling of at least two mixed PET plastic articles, simultaneously or sequentially.

These and the other objects and embodiments of the invention will become more apparent after the detailed description of the invention, including preferred embodiments thereof given in general terms.

DETAILED DESCRIPTION OF THE INVENTION

The present invention refers to a complete recycling process for recycling mixed PET plastic article(s) containing PET polymers by depolymerizing at least PET polymers of said plastic article(s), wherein a repolymerizable monomer and/or oligomer mixture is generated and may be further recovered.

Definitions

The present disclosure will be best understood by reference to the following definitions.

Within the context of the invention, the term "mixed PET plastic article" refers to any item or product or material (such as plastic sheet, tube, rod, profile, shape, massive block, fiber, etc.) comprising polyethylene terephthalate (PET) and at least one additional component. In the context of the invention, mixed PET plastic article encompasses all kind of plastic articles composed of polyethylene terephthalate polymers and further component(s) arranged relative to each other in such a way that they cannot be easily separated. Preferably, the mixed plastic article is a manufactured product like packaging, agricultural films, disposable items or the like, carpet scrap, fabrics, textiles etc. Furthermore, the polymers of the mixed PET plastic article may be crystallized and/or semi-crystallized polymers or amorphous polymers or a mix of crystallized and/or semi-crystallized and amorphous polymers.

A "polymer" refers to a chemical compound or mixture of compounds whose structure is constituted of multiple repeating units linked by covalent chemical bonds. Within the context of the invention, the term polymer includes natural or synthetic polymers, constituting of a single type of repeat unit (i.e., homopolymers) or of a mixture of different repeat units (i.e., copolymers). Synthetic polymers include polymers derived from petroleum oil, such as polyolefins, aliphatic or aromatic polyesters, polyamides, polyurethanes and polyvinyl chloride. Natural polymers include lignin and polysaccharides, such as cellulose, hemi-cellulose, starch and derivatives thereof.

According to the invention, "oligomers" refer to molecules containing from 2 to about 20 monomer units. Advantageously, oligomers retrieved with the process of the invention include methyl-2-hydroxyethyl terephthalate (MHET) and/or bis(2-hydroxyethyl) terephthalate (BHET) and/or 2-hydroxyethyl benzoate (HEB) and/or dimethyl terephthalate (DMT).

"Polyethylene terephthalate" or "Polyethylene terephthalate polymer", also abbreviated PET or PETE, are used interchangeably and refer to a thermoplastic polymer resin of the polyester family, produced from monomers of monoethylene glycol (MEG) and dimethyl terephthalate (DMT) or purified terephthalic acid (PTA). PET may exist both as an amorphous and as a semi-crystalline polymer. In the context of the invention, homopolymers and copolymers of PET are also encompassed. Examples of copolymers are polyethylene terephthalate glycol-modified (PETG), wherein cyclohexane dimethanol is added to the polymer backbone in place of ethylene glycol, or polyethylene terephthalate isophthalic acid-modified, wherein isophthalic acid replaces some of the linkage of terephthalate units, or bi-axially oriented PET (BOPET), or oriented PET (OPET), etc.

A "recycling process" or "complete recycling process" in relation to a plastic article refers to a process by which at least one polymer of said plastic article is degraded to yield repolymerizable monomers and/or oligomers, which are advantageously retrieved in order to be reused.

In the present description, a "recombinant microorganism" refers to a microorganism whose genome has been modified by insertion of at least one nucleic acid sequence or unit, which corresponds to at least a gene or part thereof not identical to the nucleic acid sequence of a gene naturally present in the existing microorganism. Said nucleic acid sequence or unit has been assembled and/or inserted in said microorganism or an ancestor thereof, using recombinant DNA technology (also called gene cloning or molecular cloning) which refers to techniques of transfer of DNA from one organism to another. A "recombinant microorganism" further includes a microorganism whose genome has been modified by inactivation of at least one nucleic acid sequence or unit. Recombinant microorganisms can be generated by a variety of methods known per se in the art and subsequently maintained or reproduced or expanded in culture, without use of further recombinant DNA technology. Otherwise, the recombinant microorganism may be issued from a metagenomic library.

A "mutant" in relation to an enzyme refers to an enzyme wherein at least one amino acid is different from the wild-type enzyme.

The terms "nucleic acid", "nucleic sequence," "polynucleotide", "oligonucleotide" and "nucleotide sequence"

are used interchangeably and refer to a sequence of deoxyribonucleotides and/or ribonucleotides. The nucleotide sequence may be first prepared by e.g., recombinant, enzymatic and/or chemical techniques, and subsequently replicated in a host cell or an in vitro system. The nucleotide sequence preferentially comprises an open reading frame encoding a (poly)peptide. The nucleotide sequence may contain additional sequences such as a transcription terminator, a signal peptide, an intron, a binding domain, etc.

Within the context of the invention, the term "derived from a microorganism" in relation to an enzyme or (poly)peptide indicates that the enzyme or (poly)peptide has been isolated from such a microorganism, or that the enzyme or (poly)peptide comprises all or a biologically active part of the amino acid sequence of an enzyme or (poly)peptide isolated or characterized from such a microorganism.

The term "vector" refers to DNA or RNA molecule used as a vehicle to transfer recombinant genetic material into a host cell. The major types of vectors are plasmids, bacteriophages, viruses, cosmids, and artificial chromosomes. Vectors called expression vectors (expression constructs) are specifically adapted for the expression of the heterologous sequences in a target cell, and generally have a promoter sequence that drives expression of the heterologous sequences. Generally, the regulatory elements that are present in an expression vector include a transcriptional promoter, a ribosome binding site, a terminator, and/or an operator. Preferably, an expression vector also contains an origin of replication for autonomous replication in a host cell, a selectable marker, a limited number of useful restriction enzyme sites, and/or a potential for high copy number. Expression vectors providing suitable levels of polypeptide expression in different hosts are well known in the art. Bacterial expression vectors well known in the art include pET11a (Novagen), lamda gt11 (Invitrogen).

Expression vectors may be introduced into host cells using standard techniques. Examples of such techniques include transformation, transfection, lipotransfection, protoplast fusion, and electroporation. Examples of techniques for introducing nucleic acid into a cell and expressing the nucleic acid to produce protein are provided in references such as Ausubel, Current Protocols in molecular biology, John wiley, 1987-1998, and Sambrook, et al., in Molecular cloning, A laboratory Manual $2^{nd}$ Edition, Cold Spring Harbor Laboratory Press, 1989.

Mixed Plastic Article

The present invention discloses a novel method for degrading at least one mixed PET plastic article to generate monomers and/or oligomers which may be reused, e.g., for creating polymers and/or fabricating new items.

The inventors have developed a recycling process suitable for degrading mixed PET plastic article(s), without preliminary separation of PET from the other components. The process of the invention may be advantageously applied to mixed PET plastic articles coming directly from plastic waste collection and/or post-industrial waste. More particularly, the process of the invention may be applied on a mix of domestic plastic wastes, including plastic bottles, plastic bags and plastic packaging, soft and/or hard plastics, even polluted with food residues, surfactants, etc. According to the invention, the recycling process may also be used for recycling plastic articles containing 100% by weight of PET, even if mixed with other plastic articles, including plastic articles free of PET.

The content of PET in the mixed PET plastic article may vary from 5% by weight to less than 100% by weight, preferably from 10% to 95% by weight. For instance, in flexible food packaging like pouches, the PET content is from 14% by weight to about 65% by weight, PET being associated with PVC, OPS, LDPE, OPP, OPET, aluminium, PP, etc.

In a first embodiment, the content of PET represents less than 50% by weight of the total weight of the mixed PET plastic article. Preferably, the content of PET represents from 5% to 45% by weight, more preferably from 10% to 40% by weight, even more preferably from 10% to 35% by weight.

In a second embodiment, the content of PET represents more than 50% by weight of the total weight of the mixed PET plastic article. Preferably, the content of PET represents from 55% to 95% by weight, more preferably from 65% to 95% by weight, even more preferably from 75% to 95% by weight.

According to the invention, the additional component(s) of the mixed PET plastic article is preferably selected from polymers, such as polyesters (different from PET), polyamides, polyolefins or vinyl polymers, metal compounds, glass compounds, fibers, paper, minerals, wood or wood compounds such as lignin, cellulose or hemi-cellulose, and starch and derivatives thereof. Classically, the mixed PET plastic article may further contains, in addition to the additional component(s), other substances or additives, such as plasticizers, mineral or organic fillers, oxygen scavengers, compatibilizers, adhesives or inks.

In a particular embodiment, the mixed plastic articles comprise, in addition to PET, another polyester and/or at least one polyamide and/or at least one polyolefin and/or at least one vinyl polymer.

Accordingly, the mixed PET plastic article may contain an additional polyester, preferably selected from polytrimethylene terephthalate (PTT), polybutylene terephthalate (PBT), polyethylene isosorbide terephthalate (PEIT), polylactic acid (PLA), poly(L-lactic acid) (PLLA), poly(D-lactic acid) (PDLA), poly(D,L-lactic acid) (PDLLA), PLA stereocomplex (scPLA), polyglycolic acid (PGA), polyhydroxyalkanoate (PHA), poly(3-hydroxybutyrate) (P(3HB)/PHB), poly(3-hydroxyvalerate) (P(3HV)/PHV), poly(3-hydroxyhexanoate) (P(3HHx)), poly(3-hydroxyoctanoate) (P(3HO)), poly(3-hydroxydecanoate) (P(3HD)), Poly(3-hydroxybutyrate-co-3-hydroxyvalerate) (P(3HB-co-3HV)/PHBV), poly(3-hydroxybutyrate-co-3-hydroxyhexanoate) (P(3HB-co-3HHx)/(PHBHHx)), poly(3-hydroxybutyrate-co-5-hydroxyvalerate) (PHB5HV), poly(3-hydroxybutyrate-co-3-hydroxypropionate) (PHB3HP), polyhydroxybutyrate-co-hydroxyoctonoate (PHBO), polyhydroxybutyrate-co-hydroxyoctadecanoate (PHBOd), poly(3-hydroxybutyrate-co-3-hydroxyvalerate-co-4-hydroxybutyrate) (P(3HB-co-3HV-co-4HB)), polybutylene succinate (PBS), polybutylene succinate adipate (PBSA), polybutylene adipate terephthalate (PBAT), polyethylene furanoate (PEF), polycaprolactone (PCL), poly(ethylene adipate) (PEA), polyethylene naphthalate (PEN), polycyclohexylenedimethylene terephthalate (PCT) and blends/mixtures of these materials.

Alternatively or in addition, the mixed PET plastic article may contain a polyamide (also called nylon), preferably selected from polyamide-6 or poly(β-caprolactam) or polycaproamide (PA6), polyamide-6,6 or poly(hexamethylene adipamide) (PA6,6), poly(11-aminoundecanoamide) (PA11), polydodecanolactam (PA12), poly(tetramethylene adipamide) (PA4,6), poly(pentamethylene sebacamide) (PA5,10), poly(hexamethylene azelaamide) (PA6,9), poly(hexamethylene sebacamide) (PA6,10), poly(hexamethylene dodecanoamide) (PA6,12), poly(m-xylylene adipamide)

(PAMXD6), polyhexamethylene adipamide/polyhexamethyleneterephtalamide copolymer (PA66/6T), polyhexamethylene adipamide/polyhexamethyleneisophtalamide copolymer (PA66/6I) and blends/mixtures of these materials.

In a particular embodiment, the mixed PET plastic article contains from 1% to 45% by weight of polyamide, preferably from 2% to 30%, and even more preferably from 2% to 20% by weight of polyamide.

In another particular embodiment, the mixed PET plastic article contains from 55% to 90% by weight of polyamide, preferably from 65% to 90%, and even more preferably from 70% to 90% by weight of polyamide.

Alternatively or in addition, the mixed PET plastic article may further contain a polyolefin, preferably selected from the group consisting of polyethylene (PE), polypropylene (PP), polymethylpentene (PMP), polybutene-1 (PB-1), polyisobutylene (PIB), ethylene propylene rubber (EPR), ethylene propylene diene monomer rubber (EPDM), cyclic olefin copolymer (COC) and blends/mixtures of these materials.

In a particular embodiment, the mixed PET plastic article contains from 1% to 45% by weight of polyolefins, preferably from 2% to 40%, and even more preferably from 5% to 35% by weight of polyolefins.

In another embodiment, the mixed PET plastic article contains from 55% to 90% by weight of polyolefins, preferably from 60% to 90%, and even more preferably from 70% to 90% by weight of polyolefins.

Alternatively or in addition, the mixed PET plastic articles may further contain a vinyl polymer made from vinyl monomers, small molecules containing carbon-carbon double bonds, preferably selected from the group consisting of polyethylene (PE), polypropylene (PP), polystyrene (PS), polyvinyl chloride (PVC), polyvinylidene chloride (PVdC), ethylene vinyl acetate (EVA), ethylene vinyl alcohol (EVOH), polyvinyl alcohol (PVOH) and blends/mixtures of these materials.

In another particular embodiment, the mixed PET plastic article contains at least one additional polymer selected from the group consisting of ortho-phthalaldehyde polymer (OPA), polychlorotrifluoroethylene (PCTFE) and rubber.

Preferably, the additional polymer is selected from the group consisting of polytrimethylene terephthalate (PTT), polylactic acid (PLA), polyamide-6 (PA6), polyamide-6,6 (PA6,6), poly(m-xylylene adipamide) (MXD6), polyethylene (PE), polypropylene (PP), polyvinyl chloride (PVC), ethylene vinyl alcohol (EVOH), ortho-phthalaldehyde polymer (OPA), polystyrene (PS), polychlorotrifluoroethylene (PCTFE), rubber, and derivatives thereof.

Alternatively or in addition, according to the invention, the mixed PET plastic article may contain additional compound(s) selected from metal compounds, mineral compounds, glass compounds, natural or synthetic fibers, paper, wood, wood compounds as lignin, cellulose or hemi-cellulose, starch, and/or derivatives thereof.

In a particular embodiment, the mixed PET plastic article contains from 5% to 45% by weight of fibers, preferably from 10% to 35%, more preferably from 25% to 45% by weight of fibers.

In another particular embodiment, the mixed PET plastic article contains from 55% to 95% by weight of fibers, preferably from 60% to 90%, more preferably from 65% to 90% by weight of fibers. Advantageously, the fibers are selected from the group consisting of carbon fibers, flax fibers, hemp fibers, wood fibers, paper fibers, straw fibers, jute fibers, cotton fibers, viscose fibers, glass fibers, metal fibers, aramid fibers, boron fibers, ceramic fibers, liquid crystal polymer fibers, polyester fibers and mixture(s) thereof, etc. Preferably, the mixed PET plastic article comprises cotton fibers and/or viscose fibers and/or nylon fibers. Examples of such mixed plastic article include textiles, fabrics, rugs and carpets.

In a particular embodiment, the mixed PET plastic article comprises at least one metal compound. Advantageously, metal compounds are selected from aluminium such as foil, aluminium oxyde, titanium, titanium oxide, nickel or chrome, preferably from aluminium.

For instance, the mixed PET plastic article contains from 1% to 70% by weight of metal compounds, preferably from 2% to 50%, more preferably from 2% to 40% by weight of metal compounds.

In a particular embodiment, the mixed plastic article comprises at least one mineral compound, preferably selected from silica or silicon dioxide, glass, or mica.

In a preferred embodiment, the additional compound(s) are selected from the group of consisting aluminium, cellulose, starch or mixture thereof.

The process of the invention is designed for recycling any mixed PET plastic article. The mixed PET plastic article targeted by the process of the invention may comprise different kinds of plastic materials, including synthetic plastic materials, derived from petrochemicals, or biobased plastic materials (i.e. composed in whole or significant part of biological products).

According to the invention, PET and the additional component(s) may be combined differently in the mixed PET plastic articles. For instance, they may be mixed altogether to form a same mass, including blends produced by extrusion. Alternatively or in addition, the mixed PET plastic articles may be constituted of several layers and/or parts containing different components. Alternatively, the mixed PET plastic article may be a PET composite article constituted of natural or synthetic fibers impregnated with PET resin, such as glass reinforced polyester used in the building industry for facades, porticos, planters, balustrades, etc.

For instance, the mixed PET plastic articles may comprise plastic sheet(s), tube(s), rod(s), profile(s), shape(s), massive block(s), fiber(s), etc. The different layers/parts of the mixed PET plastic articles can coexist, be adjacent, joined together or imbricated.

Accordingly, the process of the invention may be used for recycling mixed PET plastic article(s) comprising successive layers of different plastic materials. The layers may have different length, thickness etc. The layers may overlap entirely, or solely partially. The layers may be bonded with specific adhesive, during the manufacturing, through dedicated processes, etc. In a particular embodiment, one of the layer forms an adhesive between the PET layer and another layer of the plastic article. Examples of such mixed plastic articles include plastic bottles, food packaging, plastic blisters, plastic clamshells, etc. For instance, the process of the invention may be advantageously implemented for recycling plastic bottles for gaseous liquids wherein nylon-based nanocomposites or EVOH layer(s) are sandwiched between two PET layers. In the same way, the process of the invention may be implemented for recycling food packaging as trays, wherein a layer of PE is used as a welding agent between the tray and the lid that are both constituted of PET.

The process of the invention may be further used for recycling mixed PET plastic articles comprising different portions or parts made from different plastic materials. The portions may have different or same dimensions and be at least partially physically bonded together. For instance, the process of the invention may be used for recycling carpet scraps made with a blend of PET and PTT fibers or containing imbricated PET and PTT fibers.

In another embodiment, the process of the invention may be used for recycling mixed PET plastic articles made with plastic materials containing PET and another material as wood material, metal material, fibers, etc.

This kind of mixed PET plastic articles may be formed with layers or portions of these different materials that are at least partially bonded together. The layers or portions may have different dimensions and may overlap entirely or solely partially. The layers or portions may be bonded with specific adhesive, during the manufacturing, through dedicated processes, etc. For instance, the process of the invention may be used for recycling mixed PET plastic articles comprising a PET layer recovered on one side with an aluminium layer. As a particular example, the process of the invention can be used for the recycling of pouches used for food packaging comprising PET laminated with aluminium layer or foil. In another embodiment, the process of the invention may be used for recycling a flexible food packaging composed of a film of PET coated with nanocrystalline cellulose. The process of the invention can also be used for the recycling of flexible packaging such as the one used for pharmaceutical packaging comprising several components including PET, paper and aluminium.

Alternatively, this kind of mixed plastic articles may be formed with a blend of PET and fibers or imbricated PET and fibers, such as cotton, polyamide or viscose fibers. Examples of such plastic articles include textiles and fabrics.

In a further embodiment, the recycling process of the invention is applied to mixed PET plastic article manufactured with composition containing a mix of PET and at least another polymer. In another embodiment, the targeted mixed PET plastic articles are made at least partially with a PET resin wherein metallic particles and/or ceramic particles and/or glass particles are included. In a further embodiment, the recycling process of the invention is applied to plastic articles containing PET blended with cellulose acetate. In another embodiment, the recycling process of the invention is applied to plastic articles containing PET resin imbricated with woven or non-woven fibers. The resin may also contain further polymers, including another polyester and/or polyamide and/or polyolefin and/or vinyl polymer.

In a particular embodiment, the mixed PET plastic articles comprises two additional components. Advantageously, one of the additional component is a polymer, preferably selected from polyesters, polyamides and polyolefins, and the second additional component is a metal compound, preferably aluminium. For instance, the process of the invention can be used for recycling a mixed PET plastic article containing a blend and/or successive layers of PET, polyethylene such as LDPE and aluminium. As another example, the process of the invention can be used for recycling a mixed PET plastic article containing a blend and/or successive layers of PET, polypropylene and aluminium.

Depolymerases

The inventors have developed a recycling process allowing to degrade PET contained in mixed PET plastic articles in order to recover monomers and/or oligomers thereof.

According to the invention, particular depolymerases may be used for implementing the recycling process. More particularly, a cutinase, a lipase and/or an esterase may be used. In a preferred embodiment, the depolymerase is a cutinase, preferably selected from *Thermobifida cellulosityca, Thermobifida halotolerans, Thermobifida fusca, Thermobifida alba, Bacillus subtilis, Fusarium solani pisi, Humicola insolens,* and *Thielavia terrestris*. In another embodiment, the cutinase is selected from a metagenomic library.

Advantageously, the mixed PET plastic articles are contacted with the enzyme, which may be natural or synthetic. For example, the enzyme may be produced by recombinant techniques, or it may be isolated or purified from natural sources, when naturally-occurring, or it may be artificially produced.

The enzyme may be in soluble form, or on solid phase such as powder form. In particular, it may be bound to cell membranes or lipid vesicles, or to synthetic supports such as glass, plastic, polymers, filter, membranes, e.g., in the form of beads, columns, plates and the like.

The enzyme is preferably in an isolated or purified form. Preferentially, the enzymes of the invention are expressed, derived, secreted, isolated, or purified from microorganisms. The enzymes may be purified by techniques known per se in the art, and stored under conventional techniques. The enzymes may be further modified to improve e.g., their stability or activity. For instance, the enzymes are formulated with stabilizing and/or solubilizing components, such as water, glycerol, sorbitol, dextrin, including maltodextrine and/or cyclodextrine, starch, propanediol, salt, etc.

In another embodiment, the mixed plastic articles to recycle are contacted with a microorganism that synthesizes and excretes the depolymerase. In the context of the invention the enzyme may be excreted in the culture medium or towards the cell membrane of the microorganism wherein said enzyme may be anchored.

Said microorganism may naturally synthesize the depolymerase, or it may be a recombinant microorganism, wherein a recombinant nucleotide sequence encoding the depolymerase has been inserted, using for example a vector.

For example, a nucleotide molecule, encoding the depolymerase of interest is inserted into a vector, e.g. plasmid, recombinant virus, phage, episome, artificial chromosome, and the like.

Advantageously, the nucleotide molecule is under the control of a specific promoter. The vector is then transfected into host microorganisms to form recombinant microorganisms. The hosts are further cultured under culture conditions suitable for the hosts to thereby obtain recombinant cells containing the enzyme of the present invention. Culture conditions suitable for the host are well known to those skilled in the art.

The nucleotide molecule of the invention can be in isolated or purified form, and made, isolated and/or manipulated by techniques known per se in the art, e.g., cloning and expression of cDNA libraries, amplification, enzymatic synthesis or recombinant technology. The nucleotide molecule can also be synthesized in vitro by well-known chemical synthesis techniques. Nucleotide molecules of this invention may comprise additional nucleotide sequences, such as regulatory regions, i.e., promoters, enhancers, silencers, terminators, and the like that can be used to cause or regulate expression of the enzyme in a selected host cell or system.

The recombinant microorganisms may be used directly. Alternatively, or in addition, recombinant enzymes may be purified from the culture medium. Any commonly used separation/purification means, such as salting-out, gel filtration, hydrophobic interaction chromatography or ion exchange chromatography, may be used for this purpose.

In particular embodiments, microorganisms known to synthesize and excrete depolymerases of interest may be used. For example *Asperigillus oryzae, Humicola insolens, Penicillium citrinum, Fusarium solani* and *Thermobifida*

*cellulolysitica*, synthesizing and excreting a cutinase, may be used. In the same way, *Candida antarctica, Thermomyces lanuginosus, Burkholderia* spp and *Triticum aestivum* synthesize a lipase suitable for depolymerizing PET.

According to the invention, several microorganisms and/or purified enzymes and/or synthetic enzymes may be used together or sequentially to depolymerize different kinds of polymers contained in a same mixed PET plastic article or in different mixed PET plastic articles.

Advantageously, the microorganism of the invention exhibits a modified metabolism in order to prevent the consumption of the monomers and/or oligomers obtained from the degraded polymers. For example, the microorganism is a recombinant microorganism, wherein the enzymes degrading said monomers and/or oligomers have been deleted or knocked out. Alternatively, the process of the invention may be performed in a culture medium containing at least one carbon source usable by the microorganism so that said microorganism preferentially consumes this carbon source instead of the monomers and/or oligomers.

Advantageously, the mixed PET plastic articles are contacted with a culture medium containing the microorganisms, glucose or the like as a carbon source, as well as an available nitrogen source, including an organic nitrogen source (e.g., peptone, meat extract, yeast extract, corn steep liquor) or an inorganic nitrogen source (e.g., ammonium sulfate, ammonium chloride). If necessary, the culture medium may further contain inorganic salts (e.g., sodium ion, potassium ion, calcium ion, magnesium ion, sulfate ion, chlorine ion, phosphate ion). Moreover, the medium may also be supplemented with trace components such as vitamins and amino acids.

In a particular embodiment, the depolymerase is used under conditions favoring its sorption on the mixed PET plastic articles, so that PET of the mixed plastic articles are more efficiently depolymerized up to monomers and/or oligomers. More particularly, the depolymerase may be a mutated enzyme having improved affinity for the PET contained in mixed plastic articles compared to a wild-type enzyme. Alternatively, the depolymerase may be used with plastic-binding proteins or binding modules that enhance the binding between the depolymerase and the mixed PET plastic articles.

In the context of the invention, a "plastic binding protein" refers to a protein, without enzymatic activity, that facilitates the depolymerase adsorption on a plastic article. For instance, biosurfactants such as hydrophobins, that can naturally adsorb to hydrophobic substances and to interfaces between hydrophobic (plastic) and hydrophilic (aqueous medium) phases, or disrupting proteins such as expansins and swollenins that act by weakening the linkages such as hydrogen bonds between adjacent polymeric chains, may be used as plastic-binding protein.

Swollenins are proteins that have been first characterized in the saprophytic fungus *Trichoderma reesei* ("*Swollenin, a Trichoderma reesei protein with sequence similarity to the plant expansins, exhibits disruption activity on cellulosic materials.*" *Eur J Biochem* 269: 4202-4211). The protein has a N-terminal fungal-type carbohydrate-binding module family 1 domain (CBD) with cellulose-binding function, connected by a linker region to an expansin-like domain with homology to the group 1 grass pollen allergens (pfam 01357).

Expansins are closely related to non-enzymatic proteins found in the cells of various plants. Expansin are believed to promote cell expansion and thus cell growth by allowing slippage or movement of the cellulose, pectin, and/or hemicellulose chains within the plant fibers. Expansins have been shown to weaken the hydrogen bonds between paper fibers of recycled paper, including commercial papers, such as coated papers from magazines and catalogs, which can be difficult to recycle. Expansins and swollenins act by weakening the linkages such as hydrogen bonds between adjacent polymeric chains, then facilitating the accessibility of depolymerase to plastic.

The plastic-binding protein can be produced by the same microorganism than the one which produces the depolymerase.

As used herein, "hydrophobins" refer to small secreted fungal proteins containing 8 positionally conserved cysteine residues, and a distinct hydrophobic patch foxed by 4 intramolecular disulphide bonds. Hydrophobins can naturally adsorb to hydrophobic substances and to interfaces between hydrophobic (plastic) and hydrophilic (aqueous medium) phases. More particularly, hydrophobins assembly into amphiphilic structures and reduce the interface energy between the plastic and the depolymerase (Takahashi et al., 2005 Mol. Microbiol. 57, 1780-1796; Espino-Rammer et al., 2013 AEM 79, 4230-4238). Preferably, the hydrophobins are rigid enough to keep the hydrophobic patch exposed when fused to a protein (Paananen et al., 2013 Soft Matter 9, 1612-1619).

Preferably, the plastic-binding protein is a hydrophobin.

According to the invention, the plastic-binding protein does not promote by itself depolymerisation, but is able to enhance the depolymerization efficiency by facilitating the depolymerase adsorption on the mixed PET plastic article or increasing its accessibility. The use of a plastic-binding protein may enhance the depolymerization of a targeted polymer by at least 1.01-fold, e.g. at least 1.025-fold, at least 1.05-fold, at least 1.075-fold, at least 1.10-fold, at least 1.25-fold, at least 1.5-fold, at least 2-fold, at least 3-fold, at least 4-fold, at least 5-fold, at least 10-fold, or at least 20-fold, compared to same depolymerization without plastic-binding protein.

Advantageously, the plastic-binding protein is fused to the depolymerase. Alternatively, the plastic-binding protein may be a separate molecule merely put together with the depolymerase and the mixed PET plastic article to attach itself to a hydrophobic surface of the mixed PET plastic article and cooperate with the depolymerase to promote the degradation of the mixed PET plastic article. The plastic-binding protein can be used simultaneously with said depolymerase. "Simultaneously", as used herein, means administered at the same time or substantially the same time, i.e., within 30 seconds, one minute, two minutes, three minutes, four minutes, or five minutes. Alternatively, the plastic-binding protein and depolymerase can be applied sequentially. For example, the plastic-binding protein can be applied first, followed by the depolymerase. In some embodiments, the depolymerase is administered at least five minutes or more after the administration of the plastic-binding protein.

In a particular embodiment, the depolymerase comprises a "binding module" that enhances the binding of the depolymerase to the mixed PET plastic article, compared to the depolymerase without said binding module.

A "binding module" (BM) or "binding domain" refers to a consecutive amino acid sequence of a protein which improves the binding of the protein to a substrate. In the context of the invention, a binding module refers more particularly to a polypeptide that has a high affinity for or binds to a polymer of interest and that may be connected to an enzyme via a flexible linker, or spacer. Advantageously, the binding module is responsible for attachment to polymer chains and allows the active site of the enzyme to coordinate towards the plastic article. The binding module can also partially disrupt the structure of the polymer, the targeted bonds being then more accessible to the active site of the depolymerase. A binding module is most often capable of binding to a range of polymers. The binding module generally involves hydrophobic interactions via tryptophan residues or specific hydrophobic amino acids. According to the invention, the depolymerase can naturally comprise a binding module. For instance, wild-type (hemi) cellulases and chitinases contain carbohydrate binding modules, and poly(hydroxyalkanoic acid) depolymerase contains polyester binding module. Otherwise, the binding module can be an exogenous binding module fused to the depolymerase of interest to improve its sorption and thereby hydrolysis.

In a particular embodiment, the binding module is an exogenous peptide fused to the depolymerase via a linker, to promote the sorption of the enzyme to the substrate. The recombinant depolymerase has enhanced depolymerization activity compared to the wild-type depolymerase. For instance, the exogenous binding module enhances the depolymerization of a targeted polymer by at least 1.01-fold, e.g. at least 1.025-fold, at least 1.05-fold, at least 1.075-fold, at least 1.10-fold, at least 1.25-fold, at least 1.5-fold, at least 2-fold, at least 3-fold, at least 4-fold, at least 5-fold, at least 10-fold, or at least 20-fold, compared to the same depolymerization without binding module. Genetic engineering for modifying an enzyme is documented and can be easily implemented by those skilled in the art.

In a particular embodiment, the sequence of the binding module may further be modified to increase its binding properties. For instance, mutations at W68L and W68Y in the binding module of the cutinase from *Thermobifida fusca* fused with the carbohydrate binding module of cellulose CenA from *Cellulomonas fimi* enhance by 1.5 fold the PET depolymerization compared to the wild-type (Zhang et al., 2013 Carbohydrate Polymers 97, 124-129).

In a further embodiment, the process involves a recombinant depolymerase exhibiting a mutated active site and/or binding site. In particular, the active site may be enlarged compared to the wild-type enzyme to enhance the catalytic activity of the enzyme. Advantageously, the active site of the depolymerase can be broadened by site-directed mutagenesis, in order to better fit a larger polymer chain. For instance, a cutinase from *Fusarium solani pisi* with mutations at L81A or L189A increases 4 and 5 fold respectively the PET depolymerisation compared to the wild-type enzyme; and the mutation at L182A allows a 2 fold increased PA6,6 depolymerization (Araujo et al., 2007 Journal of Biotechnology 128, 849-857).

Otherwise, or in addition, the amino acids located on the surface of the depolymerase and especially those near the active site of the enzyme can also be mutated to improve the adsorption of said enzyme to plastic articles. Such mutations advantageously increase the hydrophobic interactions and decrease the surface positive charge. A neutral electrostatic potential on the surface of the region bound to the plastic can be favorable to the depolymerization.

In a particular embodiment, the recombinant depolymerase may combine two or more site-directed mutagenesis. For instance, the double mutant Q132A/T101A of the cutinase Tfu_0883 from *Thermobifida fusca* with a broader active site and higher hydrophobicity (Silva et al., 2011 Biotech. J. 6, 1230-1239) may be advantageously implemented in the process of the invention for PET depolymerization.

Recycling Process Parameters

According to the invention, mixed PET plastic articles may be recycled by contacting said plastic articles with a particular depolymerase and/or with a microorganism synthesizing and excreting such enzyme under conditions allowing degradation of PET.

In a particular embodiment, the mixed PET plastic article may be pretreated prior to be contacted with the depolymerase in order to physically change its structure, so as to increase the surface of contact between the polymers and the enzymes and/or to decrease the microbial charge coming from wastes. For example, the mixed PET plastic article may be transformed to an emulsion or a powder, which is added to a liquid medium containing the microorganisms and/or enzymes. Alternatively, the mixed PET plastic article may be mechanically ground, granulated, pelleted, etc. by cutting, impact, crushing, grinding, fractionation, cryogenic grinding, or the like, to reduce the shape and size of the material prior to be added to a liquid medium containing the microorganisms and/or enzymes. The mechanical pretreatment can also be a sonication, a centrifugation, a shear, a collisop, a high-pressure homogenizer, a maceration or a liquefaction with a rotary drum, a screw press, a disc screen shredder, or a piston press. Alternatively or additionally, a thermal pretreatment can be applied. It can be achieved with microwaves. Such thermal pretreatment may provide disinfection, pasteurization or sterilization. In another embodiment, the mixed PET plastic article is chemically pretreated to modify its structure and increase the surface of contact between the polymers and the enzymes. A base, an acid, a solvent or an ionic liquid can be used. An ozonation can also be implemented. In a particular embodiment, the plastic articles may also be sorted, washed, disinfected, sterilized and/or biologically cleaned prior to degradation. According to the invention, several pre-treatments may be combined.

The time required for degradation of a mixed PET plastic article may vary depending on the mixed PET plastic article itself (i.e., nature and origin of the plastic article, its composition, shape etc.), the type and amount of microorganisms/enzymes used, as well as various process parameters (i.e., temperature, pH, additional agents, etc.). One skilled in the art may easily adapt the process parameters to the plastic articles and/or depolymerases.

Advantageously, the process is implemented at a temperature comprised between 20° C. and 80° C., more preferably between 25° C. and 60° C. Preferably, the temperature is maintained between 25° C. and 50° C. at least during the depolymerization step. More generally, the temperature is maintained below an inactivating temperature, which corresponds to the temperature at which the enzyme is inactivated and/or the microorganism does no more synthesize the degrading enzyme. Surprisingly, the inventors discovered that the process of the invention may be implemented at a temperature below the Tg (i.e., glass transition temperature) of the PET which is superior to 70° C.

Advantageously, according to the invention, the added amount of enzyme for the depolymerization step is at most 5% by weight of plastic articles, preferably at most 1%, more preferably at most 0.1%, and even more preferably at most 0.05%. Advantageously, the added amount of degradation enzyme is in a range of 0.001% to 5% by weight of plastic article, preferably in a range of 0.001% to 1%, more preferably in a range of 0.001% to 0.1%, even more preferably in a range of 0.001% to 0.05%.

The pH of the medium may be in the range of 4 to 10. Advantageously, the pH is adjusted according to the targeted polymer/enzyme couple and the solubility of the targeted monomer for improving the process efficiency. More particularly, the pH is adjusted to be maintained at the optimal pH of the enzyme. Indeed, depolymerization of polyesters and polyamides produces acidic monomers and oligomers that induce a pH decrease. An addition of a diluted alkali can be used to compensate this acidification and maintain the pH to the optimal one.

In a particular embodiment, the process is performed under violent agitation, preferably comprised between 100 rpm and 5000 rpm, in order to favor contact between depolymerase and plastic product and so adsorption of the enzyme on the plastic.

In a particular embodiment, at least a lipophilic agent and/or hydrophilic agent is added to the medium for improving the depolymerization step. An inductor such as oligomers of polyesters or derivatives thereof can be added to the medium to improve enzyme production. A surfactant such as Tween can be added to the medium to modify interface energy between the polymer and the enzyme or microorganism and improve degradation efficiency. An organic substance or an ionic liquid could be used to swell the polymer and increase its accessibility to the microorganism or enzyme.

Advantageously, the process of the invention is performed without any degradation accelerator. In a particular embodiment, the process of the invention is performed in a degradation liquid containing only the depolymerase and water. In a particular embodiment, the process of the invention is performed without organic solvent.

The reaction time for depolymerization of at least one polymer of the plastic article is advantageously comprised between 5 and 72 hours. Such reaction time may allow the depolymerization to advance sufficiently, and will not be economically detrimental.

Separation, Purification and Reuse of the Recovered Monomers and/or Oligomers

Monomers and/or oligomers resulting from the depolymerization may be recovered, sequentially or continuously. A single type of monomer and/or oligomers or several different types of monomers and/or oligomers may be recovered, depending on the polymers and/or the starting mixed PET plastic articles.

According to the invention, preferred monomers are selected from monoethylene glycol and terephthalic acid, and preferred oligomers are selected from methyl-2-hydroxyethyl terephthalate (MHET), bis(2-hydroxyethyl) terephthalate (BHET), 2-hydroxyethyl benzoate (HEB) and dimethyl terephthalate (DMT).

The recovered monomers and/or oligomers may be further purified, using all suitable purifying method and conditioned in a re-polymerizable form. Examples of purifying methods include stripping process, separation by aqueous solution, steam selective condensation, filtration and concentration of the medium after the bioprocess, separation, distillation, vacuum evaporation, extraction, electrodialysis, adsorption, ion exchange, precipitation, crystallization, concentration and acid addition dehydration and precipitation, nanofiltration, acid catalyst treatment, semi continuous mode distillation or continuous mode distillation, solvent extraction, evaporative concentration, evaporative crystallization, liquid/liquid extraction, hydrogenation, azeotropic distillation process, adsorption, column chromatography, simple vacuum distillation and microfiltration, combined or not.

The repolymerizable monomers and/or oligomers may then be reused to synthesize polymers. Advantageously, polymers of same nature are repolymerized. However, it is possible to mix the recovered monomers and/or oligomers with other monomers and/or oligomers, in order to synthesize new copolymers.

In a particular embodiment, repolymerization is conducted using a hydrolase in appropriate conditions for allowing polymerization reaction. Initiators may be added to the monomers/oligomers solution to favour the polymerization reaction. One skilled in the art may easily adapt the process parameters to the monomers/oligomers and the polymers to synthesize.

Further aspects and advantages of the invention will be disclosed in the following examples, which should be considered as illustrative and do not limit the scope of this application. The following is a description of the present invention, including preferred embodiments thereof given in general terms. The present invention is further exemplified in the disclosure given under the heading "Examples" herein below, which provides experimental data supporting the invention and means of performing the invention.

EXAMPLES

Example 1

The present experiment shows the recovery of terephthalic acid and mono(2-hydroxyethyl)terephthalate by treating mixed PET plastic articles with the cutinase Thc_Cut1 from *Thermobifida cellulosilytica* DSM 44535.

Materials & Methods

General Recombinant DNA Techniques

*Thermobifida cellulosilytica* DSM44535 was obtained from the German Resource Centre for Biological Material (DSMZ, Germany). The strain was maintained on LB agar plates and cultivated in 500 mL shaking flasks (200 mL LB medium) at 37° C. and 160 rpm for 24 h. Cells were harvested by centrifugation at 3,200 g and 4° C. for 20 min.

Vector pET26b(+) (Novagen, Germany) was used for expression of cutinase THC_Cut1 from *Thermobifida cellulosytica* in *Escherichia coli* BL21-Gold (DE3) (Stratagene, Germany).

The gene Thc_cut1 coding for cutinase was amplified from the genomic DNA of *T. cellulosilytica* DSM44535 by standard polymerase chain reaction (PCR). On the basis of the known sequence of genes coding for cutinases from *T. fusca* YX (Genbank accession numbers YP_288944 and YP_288943,33) two primers were designed, 5'-CCCCCGCTCATATGGCCAACCCCTACGAGCG-3' (forward primer—SEQ ID No 1) and 5'-GTGTTCTAAGCTTCAGTGGTGGTGGTGGTGGTGCTCGAGTGCCAGGCACTGAGAG TAGT-3' (reverse primer—SEQ ID No 2), allowing amplification of the respective gene without signal peptide and introduction of the 6×His-Tag at the C-terminus of the cutinase. The designed primers included restriction sites NdeI and HindIII for cloning the gene into the vector pET26b(þ). The PCR was done in a volume of 50 μL with genomic DNA as template, 0.4 μM of each primer, 0.2 mM dNTP's, 5 units Phusion DNA polymerase (Finnzymes) and 1× reaction buffer provided by the supplier. The PCR was performed in a Gene Amp PCR 2200 thermocycler (Applied Biosystems, USA). 35 cycles were done, each cycle with sequential exposure of the reaction mixture to 98° C. (30 s, denaturation), 63° C. (30 s, annealing), and 72° C. (30 s, extension). Plasmids and DNA fragments were purified by Qiagen DNA purification kits (Qiagen, Germany). The purified amplified PCR-products thus obtained were digested with restriction endonucleases NdeI and HindIII (New England Biolabs, USA), dephosphorylated with alkaline phosphatase (Roche, Germany) and ligated to pET26b(þ) with T4 DNA-ligase (Fermentas, Germany) and transformed in *E. coli* BL21-Gold(DE3) in accordance to the manufacturer's instructions.

The sequence of the gene was determined by DNA sequencing using the primers 5'-GAGCGGATAACAATTC-CCCTCTAGAA-3' (SEQ ID No 3) and 5'-CAGCTTC-CTTTCGGGCTTTGT-3' (SEQ ID No 4). DNA was sequenced as custom service (Agowa, Germany). Analysis and handling of DNA sequences was performed with Vector NTi Suite 10 (Invitrogen, USA). Sequences of proteins were aligned using the Clustal W program (Swiss EMBnet node server). The nucleotide sequence of the isolated gene has been deposited in the GenBank database under accession number HQ147786 (Thc_cut2).

Expression and Purification of Cutinase

Freshly transformed *E. coli* BL21-Gold (DE3) cells were used to inoculate 20 mL of LB-medium supplemented with 40 µg/mL kanamycin and cultivated overnight at 37° C. and 160 rpm. The overnight culture was used to inoculate 200 mL of LB-medium with 40 µg/mL kanamycin to OD600=0.1 and incubated until an OD600=0.6-0.8 was reached. Afterwards the culture was cooled to 20° C. and induced with IPTG at a final concentration of 0.05 mM. Induction was done for 20 h at 20° C. and 160 rpm. The cells were harvested by centrifugation (20 min, 4° C., 3,200 g).

Cell pellet from 200 mL cell culture was resuspended in 30 mL binding buffer (20 mM $NaH_2PO_4*2H_2O$, 500 mM NaCl, 10 mM imidazole, pH 7.4). The resuspended cells were sonicated with three-times 30-s pulses under ice cooling (Vibra Cell, Sonics Materials, Meryin/Satigny, Switzerland). The lysates were centrifuged (30 min, 4° C., 4,000 g) and filtered through a 0.2 µm membrane. The cell lysate was purified using an Åkta purification system with HisTrap FF columns (elution buffer 20 mM $NaH_2PO_4*2H_2O$, 500 mM NaCl, 500 mM imidazole, pH 7.4). For characterization of cutinase, the HisTag elution buffer was exchanged with 100 mM Tris HCl pH 7.0 by the use of PD-10 desalting columns (GE Healthcare).

Protein concentration was determined by the Bio-Rad protein assay kit (Bio-Rad Laboratories GmbH) and bovine serum albumin as protein standard. SDS-PAGE was performed corresponding to Laemmli (Laemmli, U. K. Nature 1970, 227 (5259), 680-685) and proteins were stained with Coomassie Brillant Blue R-250.

All chemicals were of analytical grade from Sigma (Germany).

Hydrolysis of Mixed PET Plastic Articles

The mixed PET plastic articles were pre-treated to increase the surface of contact between PET and the enzyme. They were mechanically ground into powders using a cutting mill SM-2000 (Retsch) during 5 min. Collected powder was then sieved with a sieveR AS 200 (Retsch) during 10 min with an amplitude of 1.5 mm to obtain powder between 500 µm and 250 µm particle size. Differential Scanning calorimetry (DSC) tests were used in order to determine glass temperature (Tg) and crystallinity of PET in mixed PET plastic articles, using a Q100 TA-RCS 90 Instrument under nitrogen atmosphere (50 mL/min) at a scanning rate of 10° C./min from −50° C. to 300° C. in aluminium pans on around 8 mg samples.

In each sample, 10 mg plastic product were incubated with 5 µM cutinase in 1 mL buffer $KH_2PO_4/K_2HPO_4$ 100 mM, pH 7.0 for 24 h at 50° C. with 300 rpm shaking. All experiments were carried out in triplicates. Controls were performed using 1 mL buffer without enzyme.

Terephthalic Acid (TA) and Mono(2-Hydroxyethyl)Terephthalate (MHET) Assay

After enzymatic treatment, proteins were precipitated using 1:1 (v/v) absolute methanol (Merck) on ice. Samples were centrifuged (Hettich MIKRO 200 R, Tuttlingen, Germany) at 16,000 g at 0° C. for 15 min. 500 µL of supernatant were brought to an HPLC vial and acidified by adding 3.5 µL of 6N HCl. The HPLC used was a DIONEX P-580 PUMP (Dionex Cooperation, Sunnyvale, USA), with an ASI-100 automated sample injector and a PDA-100 photodiode array detector. For analysis of TA and MHET, a reversed phase column RP-C18 (Discovery HS-C18, 5 µm, 150×4.6 mm with precolumn, Supelco, Bellefonte, USA) was used. Analysis was carried out with 60% water, 10% 0.01N $H_2SO_4$ and 30% methanol as eluent, gradual (15 min) to 50% methanol and 10% acid, gradual (to 20 min) 90% methanol and acid, staying 2 min and then gradual to starting position, 5 min post run. The flow rate was set to 1 mL/min and the column was maintained at a temperature of 25° C. The injection volume was 10 µL. Detection of TA and MHET was performed with a photodiode array detector at the wavelength of 241 nm.

Results

Example 1A: Recycling of a Mixed PET Plastic Article Made of PET and Polyolefin

A ham packaging made of PET and polyethylene PE (Herta "tendre noix"®) was hydrolyzed for TA recovery. The proportion of PE was estimated to 8% (w/w). PET had a Tg of 80° C. and was semi-crystalline with 10% of crystallinity.

The PET-PE powder was hydrolyzed by the cutinase Thc_Cut1 and terephthalic acid was recovered in only 24 h (347±19 µM), whereas no terephthalic acid was detected in controls. In the same way, MHET was recovered: 71±3 µM in 24 h.

Example 1B: Recycling of a Mixed PET Plastic Article Made of PET and Polyamide

A sparkling water bottle made of PET and PA (nylon poly(m-xylylene adipamide) called MXD6) (Perrier®) was hydrolyzed for TA recovery. The proportion of PA was estimated to 8% (w/w). PET had a Tg of 76° C. and was semi-crystalline with 23% of crystallinity.

The PET-PA powder was hydrolyzed by the cutinase Thc_Cut1 and terephthalic acid was recovered in only 24 h (332±7 µM), whereas no terephthalic acid was detected in controls. In the same way, MHET was recovered: 65±2 µM in 24 h.

Example 1C: Recycling of a Mixed PET Plastic Article Made of PET and Cotton

A portion of a clothing made of PET and cotton was hydrolyzed for TA recovery. The specified proportions were as 65% (w/w) of cotton and 35% (w/w) of PET.

The PET-cotton fiber was hydrolyzed by the cutinase Thc_Cut1 and about 4 µM of terephthalic acid was recovered in 24 h, whereas no terephthalic acid was detected in controls. In the same way, about 2 µM MHET was recovered in 24 h.

Example 1D: Recycling of a Mixed PET Plastic Article Made of PET and Aluminium Foil A food packaging pouch made of PET and aluminium foil ("Elle et Vire Crème légère épaisse"®) was hydrolyzed for TA recovery. The proportion of aluminium was estimated to 10% (w/w). PET was semi-crystalline.

The PET-aluminium powder was hydrolyzed by the cutinase Thc_Cut1 and about 88 µM of terephthalic acid was recovered in 24 h, whereas no terephthalic acid was detected in controls. In the same way, about 51 µM of MHET was recovered in 24 h.

Example 1E: Recycling of Several Mixed PET Plastic Article

A mixture of mixed PET plastic articles used in Example 1A (packaging made of PET and PE), 1B (packaging made of PET and PA), 1C (packaging made of PET and aluminium) and 1D (fabric made of PET and cotton) were hydrolyzed together for TA recovery, by the cutinase Thc_Cut1. About 780 µM of terephthalic acid was recovered in 24 h, whereas no terephthalic acid was detected in controls. In the same way, about 200 µM of MHET was recovered in 24 h.

Example 2

The present experiment shows the recovery of terephthalic acid and mono(2-hydroxyethyl)terephthalate by treating a PET bottle containing PET and additives with the cutinase Thc_Cut1 from *Thermobifida cellulosilytica* DSM 44535.

General recombinant DNA techniques, expression and purification of the cutinase are the same than in Example 1.

PET bottles, previously containing mineral water under trademark Cristalline®, were treated. The whole bottles were pre-treated to increase the surface of contact between PET and the enzyme. They were mechanically ground into powders using a cutting mill SM-2000 (Retsch) during 5 min. Collected powder was then sieved with a siever AS 200 (Retsch) during 10 min with an amplitude of 1.5 mm to obtains powder of 250 µm particle size. Differential Scanning calorimetry (DSC) tests were used in order to determine glass temperature (Tg) and crystallinity of PET in plastic product, using a Q100 TA-RCS 90 Instrument under nitrogen atmosphere (50 mL/min) at a scanning rate of 10° C./min from −50° C. to 300° C. in aluminium pans on around 8 mg samples. PET bottle powder had a Tg of 77.2° C. and was semi-crystalline with 30% of crystallinity.

Hydrolysis was performed in each sample as follows. 10 mg plastic product were incubated with 5 µM cutinase in 1 mL buffer KH2PO4/K2HPO4 100 mM, pH 7.0 for 24 h at 60° C. with 300 rpm shaking. All experiments were carried out in triplicates. Controls were performed using 1 mL buffer without enzyme.

Results

Terephthalic acid (TA) and mono(2-hydroxyethyl)terephthalate (MHET) were assayed as in Example 1.

The PET bottle was hydrolyzed by the cutinase Thc_Cut1 and terephthalic acid was recovered in only 24 h (252±13 µM), whereas no terephthalic acid was detected in controls. In the same way, MHET was recovered: 35±1 µM in 24 h.

Example 3

Mixed PET plastic articles formulated with additives can be recycled thanks to the process of the invention. The present experiment shows the recovery of terephtalic acid by treating a mixed PET plastic product constituted of semi-crystalline PET with mutants of the cutinase Thc_Cut2 from *Thermobifida cellulosilytica* DSM 44535. These multiple mutants, the double mutant (DM) Arg29Asn_Ala30Val and the triple mutant (TM) Arg19Ser_Arg29Asn_Ala30Val, have surface properties that enhance the cutinase adsorption on PET and thus increase the depolymerization efficiency.

General Recombinant DNA Techniques

*Thermobifida cellulosilytica* DSM44535 was obtained from the German Resource Centre for Biological Material (DSMZ, Germany). The strain was maintained on LB agar plates and cultivated in 500 mL shaking flasks (200 mL LB medium) at 37° C. and 160 rpm for 24 h. Cells were harvested by centrifugation at 3,200 g and 4° C. for 20 min.

Vector pET26b(+) (Novagen, Germany) was used for expression of cutinase THC_Cut2 from *Thermobifida cellulosytica* in *Escherichia coli* BL21-Gold (DE3) (Stratagene, Germany).

The gene Thc_cut2 coding for cutinase was amplified from the genomic DNA of *T. cellulosilytica* DSM44535 by standard polymerase chain reaction (PCR). On the basis of the known sequence of genes coding for cutinases from *T. fusca* YX (Genbank accession numbers YP_288944 and YP_288943,33) two primers were designed, 5'-CCCCCGCTCATATGGCCAACCCCTACGAGCG-3' (forward primer—SEQ ID No 1) and 5'-GTGTTCTAAGCT-TCAGTGGTGGTGGTGGTGGTGCTCGAGTGCCAG-GCACTGAGAG TAGT-3' (reverse primer—SEQ ID No 2), allowing amplification of the respective gene without signal peptide and introduction of the 6×His-Tag at the C-terminus of the cutinase. The designed primers included restriction sites NdeI and HindIII for cloning the gene into the vector pET26b(1)). The PCR was done in a volume of 50 µL with genomic DNA as template, 0.4 µM of each primer, 0.2 mM dNTP's, 5 units Phusion DNA polymerase (Finnzymes) and 1× reaction buffer provided by the supplier. The PCR was performed in a Gene Amp PCR 2200 thermocycler (Applied Biosystems, USA). 35 cycles were done, each cycle with sequential exposure of the reaction mixture to 98° C. (30 s, denaturation), 63° C. (30 s, annealing), and 72° C. (30 s, extension). Plasmids and DNA fragments were purified by Qiagen DNA purification kits (Qiagen, Germany). The purified amplified PCR-products thus obtained were digested with restriction endonucleases NdeI and HindIII (New England Biolabs, USA), dephosphorylated with alkaline phosphatase (Roche, Germany) and ligated to pET26b( þ ) with T4 DNA-ligase (Fermentas, Germany) and transformed in *E. coli* BL21-Gold(DE3) in accordance to the manufacturer's instructions.

The sequence of the gene was determined by DNA sequencing using the primers 5'-GAGCGGATAACAATTC-CCCTCTAGAA-3' (SEQ ID No 3) and 5'-CAGCTTC-CTTTCGGGCTTTGT-3' (SEQ ID No 4). DNA was sequenced as custom service (Agowa, Germany). Analysis and handling of DNA sequences was performed with Vector NTi Suite 10 (Invitrogen, USA). Sequences of proteins were aligned using the Clustal W program (Swiss EMBnet node server). The nucleotide sequence of the isolated gene has been deposited in the GenBank database under accession number HQ147786 (Thc_cut2).

Site-Directed Mutagenesis of Thc_Cut2

Site-directed mutagenesis of Thc_Cut2 was carried out by the QuikChange multisite-directed mutagenesis kit (Stratagene) using pET26b(+)_Thc_cut2 as template (Herrero Acero et al., 2011 Macromol 44, 4640) and megaprimers carrying the appropriate mutation (Thc_Cut2_Asn29_Val30.FW-SEQ ID No 5; Thc_Cut2_Asn29_Val30.Rev-SEQ ID No 6; Thc_Cut2_Asn29_Val30_Ser19.FW-SEQ ID No 7 and Thc_Cut2_Asn29_Val30_Ser19.Rev-SEQ ID No 8). The PCR-products were transferred in *E. coli* BL21-Gold (DE3).

Expression and Purification

Freshly transformed *E. coli* BL21-Gold (DE3) cells were used to inoculate 20 mL of LB-medium supplemented with 40 µg/mL kanamycin and cultivated overnight at 37° C. and 160 rpm. The overnight culture was used to inoculate 200 mL of LB-medium with 40 µg/mL kanamycin to OD600=0.1 and incubated until an OD600=0.6-0.8 was reached. Afterwards the culture was cooled to 20° C. and induced with IPTG at a final concentration of 0.05 mM. Induction was done for 20 h at 20° C. and 160 rpm. The cells were harvested by centrifugation (20 min, 4° C., 3,200 g).

Cell pellet from 200 mL cell culture was resuspended in 30 mL binding buffer (20 mM NaH2PO4*2H2O, 500 mM NaCl, 10 mM imidazole, pH 7.4). The resuspended cells were sonicated with three-times 30-s pulses under ice cooling (Vibra Cell, Sonics Materials, Meryin/Satigny, Switzerland). The lysates were centrifuged (30 min, 4° C., 4,000 g) and filtered through a 0.2 µm membrane. The cell lysate was purified using an Äkta purification system with HisTrap FF columns (elution buffer 20 mM NaH2PO4*2H2O, 500 mM NaCl, 500 mM imidazole, pH 7.4). For characterization of cutinase the HisTag elution buffer was exchanged with 100 mM Tris HCl pH 7.0 by the use of PD-10 desalting columns (GE Healthcare).

Protein concentrations were determined by the Bio-Rad protein assay kit (Bio-Rad Laboratories GmbH) and bovine serum albumin as protein standard. SDS-PAGE was performed corresponding to Laemmli (Laemmli, U. K. Nature 1970, 227 (5259), 680-685) and proteins were stained with Coomassie Brillant Blue R-250.

All chemicals were of analytical grade from Sigma (Germany).

Hydrolysis of Plastic Product

PET bottles, previously containing mineral water under trademark Cristalline®, were treated. The whole bottles were pre-treated to increase the surface of contact between PET and the enzyme. They were mechanically ground into powders using a cutting mill SM-2000 (Retsch) during 5 min. Collected powder was then sieved with a siever AS 200 (Retsch) during 10 min with an amplitude of 1.5 mm to obtains powder of 250 µm particle size. Differential Scanning calorimetry (DSC) tests were used in order to determine glass temperature (Tg) and crystallinity of PET in plastic product, using a Q100 TA-RCS 90 Instrument under nitrogen atmosphere (50 mL/min) at a scanning rate of 10° C./min from −50° C. to 300° C. in aluminium pans on around 8 mg samples.

PET bottle powder had a Tg of 77.2° C. and was semi-crystalline with 30% of crystallinity.

In each sample, 10 mg plastic product was incubated with 5 µM recombinant cutinase in 1 mL buffer Tris/HCl 100 mM, pH 7.0 for 24 h at 50° C. with 300 rpm shaking. All experiments were carried out in triplicates. Controls were performed using 1 mL buffer without enzyme.

Terephthalic Acid (TA) Assay

After enzymatic treatment, proteins were precipitated using 1:1 (v/v) absolute methanol (Merck) on ice. Samples were centrifuged (Hettich MIKRO 200 R, Tuttlingen, Germany) at 16,000 g at 0° C. for 15 min. The supernatant for measurement was brought to an HPLC vial and acidified by adding 3.5 µL of 6N HCl. The HPLC used was a DIONEX P-580 PUMP (Dionex Cooperation, Sunnyvale, USA), with an ASI-100 automated sample injector and a PDA-100 photodiode array detector. For analysis of TA, a reversed phase column RP-C18 (Discovery HS-C18, 5 µm, 150×4.6 mm with precolumn, Supelco, Bellefonte, USA) was used. Analysis was carried out with 60% water, 10% 0.01N H2SO4 and 30% methanol as eluent, gradual (15 min) to 50% methanol and 10% acid, gradual (to 20 min) 90% methanol and acid, staying 2 min and then gradual to starting position, 5 min post run. The flow rate was set to 1 mL/min and the column was maintained at a temperature of 25° C. The injection volume was 10 µL. Detection of TA was performed with a photodiode array detector at the wavelength of 241 nm.

Result

PET powder was hydrolyzed by recombinant cutinases Thc_Cut2, and terephthalic acid was recovered in only 24 h, whereas no terephthalic acid was detected in controls. The mutants allowed a TA release more important than the wild-type cutinase (13±1 µM). Furthermore, the triple mutant was more efficient than the double mutant: 30±1 µM TA was obtained with the triple mutant instead of 25±1 µM with the double mutant.

The invention claimed is:

1. A process of recycling at least one mixed polyethylene terephthalate (PET) plastic article containing a mix of crystallized and/or semi crystallized PET and at least one additional component different from PET, the method comprising the steps of
   depolymerizing PET polymers of said mixed PET plastic article containing a mix of crystallized and/or semi crystallized PET and at least one additional component different from PET by contacting the mixed PET plastic article with a depolymerase, and
   recovering products selected from monomers, oligomers and mixtures thereof:
   wherein the additional component is selected from polyolefins, vinyl polymers, ortho-phthalaldehyde polymer (OPA), polychlorotrifluoroethylene (PCTFE), rubbery metal compounds, mineral compounds, glass compounds, natural or synthetic fibers, paper, wood, lignin, cellulose, hemi-cellulose, starch, and derivatives thereof.

2. The process of claim 1, wherein the mixed PET plastic article is a packaging.

3. The process of claim 2, wherein the packaging is selected from food packaging and beverage packaging.

4. The process of claim 1, wherein the mixed PET plastic article is selected from fibers.

5. The process of claim 4, wherein the fibers are selected from carpets, rugs, fabrics and textiles.

6. The process of claim 1, wherein the depolymerase is selected from the group consisting of cutinases, lipases and esterases.

7. The process of claim 1, wherein the depolymerase is a cutinase selected from a metagenomic library or from a microorganism synthesizing a cutinase.

8. The process of claim 7, wherein the microorganism synthesizing a cutinase is selected from *Thermobifida cellulosityca, Thermobifida halotolerans, Thermobifida fusca, Thermobifida alba, Bacillus subtilis, Fusarium solani pisi, Humicola insolens*, and *Thielavia terrestris*.

9. The process of claim 1, wherein the combination of PET and said additional component is selected from layers of each component, a mixture of PET and the additional component and a PET composite.

10. The process of claim 1, wherein the additional component is selected from the group consisting of polytrimethylene terephthalate (PTT), polylactic acid (PLA), polyamide-6 (PA6), polyamide-6,6 (PA6,6), poly(m-xylylene adipamide) (MXD6), polyethylene (PE), polypropylene (PP), polyvinyl chloride (PVC), ethylene vinyl alcohol (EVOH), ortho-phthalaldehyde polymer (OPA), polystyrene (PS), polychlorotrifluoroethylene (PCTFE), rubber, and derivatives thereof.

11. The process of claim 1, wherein the fibers are selected from cotton fibers, viscose fibers and nylon fibers.

12. The process of claim 1, wherein the plastic article contains a metal compound selected from aluminum, aluminum oxide, titanium, titanium oxide, nickel and chrome.

13. The process of claim 1, wherein the plastic article contains a mineral compound selected from silica, silicon dioxide and mica.

14. The process of claim 1, wherein the depolymerizing step comprises contacting the mixed PET plastic article with at least one microorganism expressing and excreting the depolymerase.

15. The process of claim 1, said method comprising a pretreatment step of the mixed PET plastic article, prior to exposure to the depolymerase, wherein the pretreatment step leads to a modified mixed PET plastic article selected from a mechanically mixed PET plastic article, a physically mixed PET plastic article, a chemically mixed PET plastic article, a biologically mixed PET plastic article, and mixtures thereof.

16. The process of claim 1, wherein the process comprises a step of recovering monoethylene glycol (MEG), terephthalic acid (PTA), methyl-2-hydroxyethyl terephthalate (MHET), bis(2-hydroxyethyl) terephthalate (BHET), 2-hydroxyethyl benzoate (HEB), dimethyl terephthalate (DMT), and mixtures thereof, and a step of reprocessing said recovered products further to produce polymers.

17. The process of claim 1, wherein at least two different polymers of the mixed PET plastic article are degraded sequentially.

18. The process of claim 1, wherein at least two different polymers of the mixed PET plastic article are degraded simultaneously.

19. The process of claim 1, wherein at least two mixed PET plastic articles are recycled sequentially.

20. The process of claim 1, wherein at least two mixed PET plastic articles are recycled simultaneously.

21. A method of producing products selected from monomers, oligomers and mixtures thereof from a mixed polyethylene terephthalate (PET) plastic article containing PET and at least one additional component, comprising exposing the mixed PET plastic article to a depolymerase able to depolymerize PET, and recovering products selected from monomers, oligomers and mixtures thereof, wherein the additional component is selected from polyolefins, vinyl polymers, ortho-phthalaldehyde polymer (OPA), polychlorotrifluoroethylene (PCTFE), rubber, metal compounds, mineral compounds, glass compounds, natural or synthetic fibers, paper, wood, lignin, cellulose, hemi-cellulose, starch, and derivatives thereof.

22. The process of claim 1, wherein the content of PET in the mixed PET plastic article represents more than 50% by weight of the total weight of the PET mixed plastic article.

* * * * *

UNITED STATES PATENT AND TRADEMARK OFFICE
CERTIFICATE OF CORRECTION

PATENT NO. : 10,385,183 B2
APPLICATION NO. : 15/310458
DATED : August 20, 2019
INVENTOR(S) : Emmanuel Maille Page 1 of 1

It is certified that error appears in the above-identified patent and that said Letters Patent is hereby corrected as shown below:

In the Specification

Column 20,
Line 31, "pET26b(1))." should read --pET26b(Þ).--.

In the Claims

Column 25,
Line 26, "rubbery" should read --rubber,--.

Signed and Sealed this
Sixteenth Day of June, 2020

Andrei Iancu
*Director of the United States Patent and Trademark Office*